US011003655B2

(12) United States Patent
Christie et al.

(10) Patent No.: US 11,003,655 B2
(45) Date of Patent: May 11, 2021

(54) SYSTEM FOR UPLOADING INFORMATION INTO A METADATA REPOSITORY

(71) Applicant: HARTFORD FIRE INSURANCE COMPANY, Hartford, CT (US)

(72) Inventors: Jennifer Babette Christie, Agawam, MA (US); Erin N Sacchi, East Hartford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 942 days.

(21) Appl. No.: 15/272,888

(22) Filed: Sep. 22, 2016

(65) Prior Publication Data

US 2018/0081763 A1    Mar. 22, 2018

(51) Int. Cl.
| | |
|---|---|
| *G06F 16/30* | (2019.01) |
| *G06F 16/23* | (2019.01) |
| *G06Q 10/06* | (2012.01) |
| *G06F 16/215* | (2019.01) |

(52) U.S. Cl.
CPC ........ *G06F 16/2365* (2019.01); *G06F 16/215* (2019.01); *G06Q 10/06* (2013.01)

(58) Field of Classification Search
CPC ............................ G06F 16/215; G06F 16/2365
See application file for complete search history.

(56) References Cited

U.S. PATENT DOCUMENTS

| | | | |
|---|---|---|---|
| 6,697,808 B1 * | 2/2004 | Hurwood | ............... G06Q 10/10 |
| 8,074,202 B2 | 12/2011 | Da Palma et al. | |
| 8,504,568 B2 | 8/2013 | Chandrasekhara et al. | |
| 8,538,745 B2 | 9/2013 | Oya et al. | |
| 2005/0044097 A1 * | 2/2005 | Singson | ............... G06Q 10/107 |
| 2006/0224617 A1 | 10/2006 | Inmon | |
| 2007/0255741 A1 * | 11/2007 | Geiger | ............. G06F 16/24573 |
| 2008/0065616 A1 * | 3/2008 | Brown | ................ H04L 67/2819 |
| 2012/0130723 A1 | 5/2012 | Bhattacharjee | |
| 2013/0218898 A1 * | 8/2013 | Raghavan | ........... G06F 16/2433 |
| | | | 707/741 |
| 2013/0297653 A1 * | 11/2013 | Chainani | ............. G06F 16/2282 |
| | | | 707/783 |
| 2014/0114924 A1 | 4/2014 | Abed et al. | |
| 2015/0066865 A1 * | 3/2015 | Yara | ........................ G06F 16/21 |
| | | | 707/667 |

(Continued)

*Primary Examiner* — Mahesh H Dwivedi
(74) *Attorney, Agent, or Firm* — Buckley, Maschoff & Talwalkar LLC

(57) ABSTRACT

A back-end application computer server may access a potential metadata entries data store containing a set of potential metadata entries, each entry including at least a data element name and a data element definition. A metadata collection system may be executed to automatically populate a metadata template based on the set of potential metadata entries. The system may update entries in the metadata template using a translation tool and validate the updated entries in the metadata template to ensure that required data elements are present. The system may also certify the validated entries load the set of certified metadata entries, including the certified data element names and certified data element definitions, into an enterprise metadata repository data store. Electronic messages may be exchanged to support at least one interactive user interface display associated with certification of the metadata template.

12 Claims, 16 Drawing Sheets

(56) References Cited

U.S. PATENT DOCUMENTS

| | | | |
|---|---|---|---|
| 2015/0134589 A1* | 5/2015 | Marrelli | G06F 16/258 707/602 |
| 2016/0026615 A1 | 1/2016 | Kellner et al. | |
| 2016/0092480 A1 | 3/2016 | Madison et al. | |

* cited by examiner

METADATA COLLECTION SYSTEM FOR ENTERPRISE METADATA REPOSITORY:
Data Steward's Work Area Display

| REFERENCE NUMBER | ACTION DESCRIPTION | TERM TYPE NAME | TERM NAME | PROPOSED TERM DEFINITION | TERM USAGE TEXT |
|---|---|---|---|---|---|
| 1 | ADD | COMPONENT | TRAVEL AND EXPENSE COVERAGE | Insurance intended to cover medical expenses, trip cancellations, lost luggage.... | - |
| 2 | ADD | MASTER NAME | TRAVEL AND EXPENSE COVERAGE TYPE CODE | Code identifying type of Travel and Expense Coverage applicable. | - |
| 3 | ADD | MASTER NAME | TRAVEL AND EXPENSE COVERAGE FORM NUMBER | Form number of the Travel and Expense Coverage applicable to the policy. | - |
| 4 | REUSE WITH CHANGE | COMPONENT | DEDUCTIBLE | - | - |

FIG. 5

METADATA COLLECTION SYSTEM FOR ENTERPRISE METADATA REPOSITORY:
Master Name and Definitions Display

| CERTIFICATION NOTES | ENTRY DATE | DATA DICTIONARY ID | ACTION DESCRIPTION | MASTER NAME | MASTER NAME DEFINITION | ABBREVIATED ENTERPRISE FACING NAME | FULL ENTERPRISE FACING NAME |
|---|---|---|---|---|---|---|---|
| - | 8/8/2018 | 2 | ADD | Travel and Expense Coverage Type Code | Code identifying type of Travel and Expense... | Trvl And Expns Cov Typ Cd | Trvl And Expns Cov Typ Cd |
| - | 8/8/2018 | 3 | ADD | Travel and Expense Coverage Form Number | Form number of the Travel and Expense Coverage... | Trvl And Expns Cov Form Num | Trvl And Expns Cov Form Num |
| - | 8/8/2018 | 5 | ADD | Travel and Expense Coverage Deductible Amount | Amount of the Deductible for Travel and Expense... | Trvl And Expns Cov Deduc Amt | Trvl And Expns Cov Deduc Amt |
| - | 8/8/2018 | 7 | ADD | Business Certified Traveler Indicator | Denotes whether or not Employee is Business... | BCT Ind | BCT Ind |

FIG. 14

| COMPONENT ID 1402 | ACTION DESCRIPTION 1404 | ACRONYM IDENTIFIER 1406 | COMPONENT NAME 1408 | COMPONENT NAME DEFINITION 1410 | REFERENCING CATEGORY NAME 1412 |
|---|---|---|---|---|---|
| C_1001 | ADD | N/A | TRAVEL AND EXPENSE COVERAGE | Insurance that is intended to cover medical expenses... | COMMERCIAL LINES |
| C_1002 | REUSE WITH CHANGE | N/A | TRAVEL AND EXPENSE COVERAGE | Insurance that is intended to cover medical expenses... | COMMERCIAL LINES |
| C_1003 | REUSE WITH CHANGE | N/A | DEDUCTIBLE | - | COMMERCIAL LINES |

1400

SYSTEM FOR UPLOADING INFORMATION INTO A METADATA REPOSITORY

BACKGROUND

In some cases, an enterprise may want to maintain a repository of information to be used by members of the enterprise. For example, the repository might include definitions, rules, business logic, and/or other types of metadata that may be used throughout the enterprise (e.g., as documents and/or software applications are created by the enterprise). Moreover, the enterprise might be interested in maintaining a level of consistency for information within the metadata repository. For example, a particular name might always refer to a specific definition and also be associated with a pre-defined set of potential values (e.g., the phrase "employee status" might always mean the current work status of a person and might only be allowed to have values of "currently employed," "new hire," "former employee," "temp worker," and "on leave"). To help ensure such consistency, members of the enterprise may access the metadata repository, such as by accessing a "Wiki" like dictionary or database of technical definitions. Creating these types of definitions, however, in a reliable and consistent way, however, can be a difficult, time consuming, and error-prone process, especially when there is a significant amount of information in the metadata repository (e.g., tens of thousands of different definitions might be included) and/or when many different members may be uploading information into the repository.

It would therefore be desirable to provide systems and methods to automatically facilitate a process of uploading information into a metadata repository in a way that results in an accurate and efficient collection of data and that allows flexibility and effectiveness when entering and/or reviewing the data.

SUMMARY OF THE INVENTION

According to some embodiments, systems, methods, apparatus, computer program code and means to automatically facilitate a process of uploading information into a metadata repository in a way that results in an accurate and efficient collection of data (and that allows flexibility and effectiveness when entering and/or reviewing the data) may be provided. In some embodiments, a back-end application computer server may access a potential metadata entries data store containing a set of potential metadata entries, each entry including at least a data element name and a data element definition. A metadata collection system may be executed to automatically populate a metadata template based on the set of potential metadata entries. The system may update entries in the metadata template using a translation tool and validate the updated entries in the metadata template to ensure that required data elements are present. The system may also certify the validated entries load the set of certified metadata entries, including the certified data element names and certified data element definitions, into an enterprise metadata repository data store. Electronic messages may be exchanged to support at least one interactive user interface display associated with certification of the metadata template.

Some embodiments comprise: means for accessing a potential metadata entries data store containing a set of potential metadata entries, each entry including at least a data element name and a data element definition; means for executing, by a back-end application computer server, a metadata collection system to automatically populate a metadata template based on the set of potential metadata entries; means for updating, by the back-end application computer server, entries in the metadata template using a translation tool; means for validating, by the back-end application computer server, the updated entries in the metadata template to ensure that required data elements are present, means for certifying, by the back-end application computer server, the validated entries in the metadata template; means for loading, by the back-end application computer server, the set of certified metadata entries, including the certified data element names and certified data element definitions, into the enterprise metadata repository data store; and means for exchanging electronic messages, including messages exchanged via a distributed communication network, supporting at least one interactive user interface display associated with certification of the metadata template.

In some embodiments, a communication device associated with a back-end application computer server exchanges information with remote devices. The information may be exchanged, for example, via public and/or proprietary communication networks.

Technical effects of some embodiments of the invention are improved and computerized ways to facilitate a process of uploading information into a metadata repository in a way that results in an accurate and efficient collection of data and that allows flexibility and effectiveness when entering and/or reviewing the data. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 5 illustrates an interactive user interface data steward's work area display in accordance with some embodiments.

FIG. 7 illustrates an interactive user interface master name and definitions display according to some embodiments.

FIG. 14 is a portion of a tabular components and definitions database in accordance with some embodiments.

DETAILED DESCRIPTION

Figure 1:
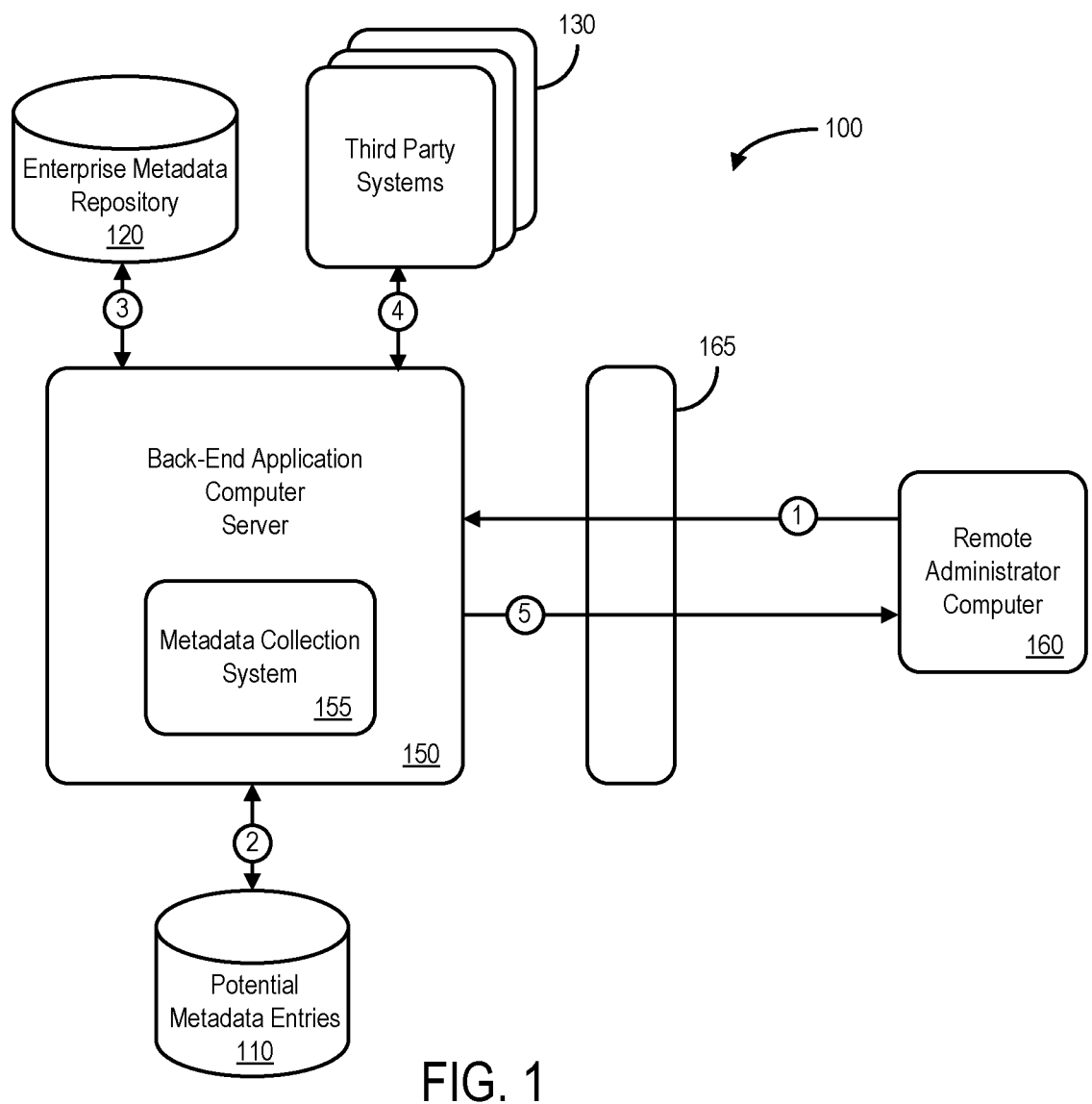
FIG. 1 is a high-level block diagram of a system according to some embodiments.

The present invention provides significant technical improvements to facilitate electronic messaging and dynamic data processing. The present invention is directed to more than merely a computer implementation of a routine or conventional activity previously known in the industry as it significantly advances the technical efficiency, access, and/or accuracy of communications between devices by implementing a specific new method and system as defined herein. The present invention is a specific advancement in the area of information definition by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks, and subsystems. For example, in the present invention metadata information may be automatically used to populate a template, be updated with a translation tool, be validated to determine that required data elements are present, etc., thus improving the overall performance of the system associated with an enterprise metadata repository (e.g., by increasing data consistency). Moreover, embodiments associated with automatic naming might further improve communication network performance, user interactions, programming (e.g., by reducing errors associated with data element naming), etc.

Note that an enterprise may want to maintain a repository of information (e.g., definitions, rules, business logic, and/or other types of metadata) to be used by members of the enterprise as documents and/or software applications are created. As used herein, the term "members" of an enterprise might include, for example, employees, contractors, vendors, co-researchers, etc. Moreover, the enterprise might be interested in maintaining a level of consistency for information within the metadata repository. For example, it might be confusing if one area of a business uses "travel accommodations and related expenses" while another area uses "travel costs" when referring to the same data element. To avoid such situations, members of the enterprise may access the metadata repository, such as by accessing a "Wiki" like dictionary or database of technical definitions. Creating these types of definitions, however, in a reliable and consistent way, however, can be a difficult, time consuming, and error-prone process, especially when there is a significant amount of information in the metadata repository (e.g., tens of thousands of different definitions might be included) and/or when many different members may be uploading information into the repository. Note that having conflicting or duplicate information in an enterprise metadata repository could, for example, result in misunderstandings between people and/or processes using the terms. Reducing the risk of such errors may create efficiencies for an organization and reduce the time and costs associated with project development. This might be especially true, for example, in situations where substantial amounts of information are being analyzed (e.g., when various big data sources are providing information into a vast big data "lake").

It would therefore be desirable to provide systems and methods to automatically facilitate a process of uploading information into a metadata repository in a way that results in an accurate and efficient collection of data (and that allows flexibility and effectiveness when entering and/or reviewing the data). FIG. 1 is a high-level block diagram of a system 100 according to some embodiments of the present invention. In particular, the system 100 includes a back-end application computer server 150 that may access information in a potential metadata entries data store 110 (e.g., storing a set of electronic records representing potential metadata entries in an enterprise repository 120, each entry including a data element name, a data element definition, etc.). The back-end application computer server 150 may also exchange information with a remote administrator computer 160 (e.g., via a firewall 165). According to some embodiments, a metadata collection system 155 of the back-end application computer server 150 may access information in the potential metadata entries data store 110, automatically update and review the information as appropriate, and eventually upload the information to the enterprise metadata repository (e.g., which then may be accessed by members via a Wiki-like dictionary). In some cases, data from third-party systems 130 may be used to facilitate this process. Note that embodiments may be associated with periodic (or asynchronous) types of uploads. Further note that the back-end application computer server 150 might also be associated with a third party, such as a vendor that performs a service for an enterprise.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may automatically review and/or adjust data in the potential metadata entries data store 110. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the potential metadata entries data store 110 and/or the enterprise metadata repository 120. The potential metadata entries data store 110 might, for example, store electronic records representing data element names, data element definitions, data element values, data element relationships, etc. The potential metadata entries data store 110 may contain that was originally input via the remote administrator computer 160 (e.g., by a data steward). The potential metadata entries data store 110 may be locally stored or reside remote from the back-end application computer server 150. As will be described further below, the potential metadata entries data store 110 may be used by the back-end application computer server 150 to automatically review and/or adjust information to be uploaded to the enterprise metadata repository. Although a single back-end application computer server 150 is shown in FIG. 1, any number of such devices may be included. Moreover, various devices described herein might be combined according to embodiments of the present invention. For example, in some embodiments, the back-end application computer server 150, potential metadata entries data store 110, and/or enterprise metadata repository 120 might be co-located and/or may comprise a single apparatus.

According to some embodiments, the system 100 may automatically review and/or adjust information via the automated back-end application computer server 150. For example, at (1) the remote administrator computer 160 may input data names and definitions that may then be stored into the potential metadata entries data store 110. At (2), the metadata collection system 155 may access the information in the potential metadata entries data store 110 and automatically review and/or adjust the data as appropriate. The reviewed and/or adjusted information may then be uploaded to the enterprise metadata repository 120 at (3) (which, according to some embodiments, may involve data associated with third party systems 130 at (4)). Report of the successful upload may then be provided to the remote administrator computer at (5). Note that the upload of the adjusted information to the enterprise metadata repository 120 at (3) may involve one or more manual steps. For example, the adjusted information might be transmitted to a team who reviews, ingests, and then uploads the information to the enterprise metadata repository 120.

Thus, some embodiments may let project teams track, manage, and certify data element names, definitions and other related business metadata needed during project development. Moreover, the proper management and stewardship of project data may be facilitated using multiple templates (e.g., each associated with a tab of a spreadsheet application) to collect and organize business metadata. The tabs associated with the metadata collection system 155 (e.g., with different tabs or worksheets representing different "displays" as described herein) may expedite metadata activities and prepare for easier entry of business metadata into the enterprise metadata repository 120 (e.g., a Wiki-like dictionary or database). The metadata collection system 155 may contain complex macros that minimize the amount of cut/paste activities to prepare the metadata to be uploaded into the repository 120 (e.g., by automatically transferring information between tabs). Embodiments may also reach out to additional resources to populate information stored in other locations and provide validation results to help ensure the quality of metadata capture.

Figure 2:
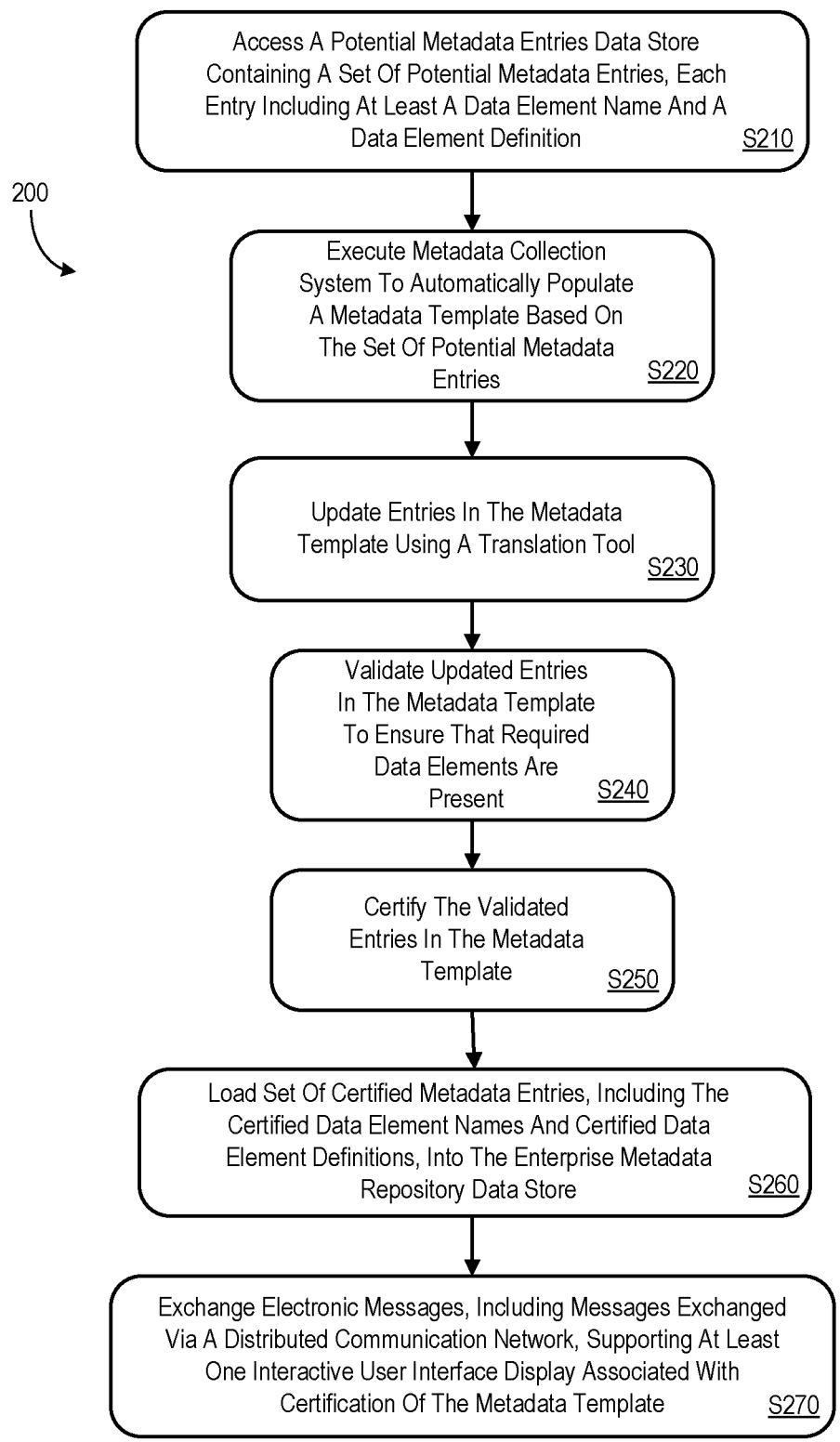
FIG. 2 illustrates a method according to some embodiments of the present invention.

Note that the system 100 of FIG. 1 is provided only as an example, and embodiments may be associated with additional elements or components. According to some embodiments, the elements of the system 100 automatically support interactive user interface displays over a distributed communication network. For example, FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back-end application computer server may access a potential metadata entries data store containing a set of potential metadata entries, each entry including at least a data element name and a data element definition. According to some embodiments, potential entries in the potential metadata entries data store may include data element master names associated with data element definitions. Moreover, the potential entries may include data element component names representing a portion of a master name. That is, a component might represent a word or set of words that describes an item or concept that is part of a master name. Components might comprise the building blocks, or the controlled vocabulary, with which master names are created. A component might be one word, a compound expression, or include an acronym. It may be, for example, a term that cannot be decomposed further without losing important information about the enterprise. A master name, on the other hand, might identify a data element that can be implemented as a physical data element. A master name might represent, according to some embodiments, a written-out, mixed case English language name that has no acronyms or abbreviations.

At S220, the back-end application computer server may execute a metadata collection system to automatically populate a metadata template based on the set of potential metadata entries. According to some embodiments, the metadata template is associated with a project and includes a project identifier, a project name, a repository identifier, a project description, a steward identifier, a steward name, a steward position title, and/or a project domain. Note that the template may store many different types of information, including, for example, an owner, a reference number, an action requested/certification notes, a term and/or definition source or origin, a derivation, an action description, a term type name, a term name, an acronym, an existing term definition, a proposed term definition, a data stewardship certification level name, a data quality business requirements indicator, a parent category name, a referencing category name, a related master name, a related master name parent category name, an example or sample, and/or term usage text.

At S230, the back-end application computer server may update entries in the metadata template using a translation tool. According to some embodiments, the updating of entries in the metadata template using a translation tool includes converting a master name to an abbreviated enterprise facing name. The system may then convert the master name to a full enterprise facing name and convert the master name to a physical name. According to some embodiments, the metadata template includes certification notes, an entry date, a metadata collection system identifier, an action description, a master name, a related class word, a master name definition, a parent category name, a referencing category name, a data stewardship certification level name, a data quality business requirements indication, the abbreviated enterprise facing name, the full enterprise facing name, an example or sample, and/or term usage text.

At S240, the back-end application computer server may validate the updated entries in the metadata template to ensure that required data elements are present. For example, entries might be validated against data in a master, enterprise-wide data store to look for missing or inconsistent data (e.g., which might raise a flag indicating that a data steward should further review the information). At S250, the back-end application computer server may certify the validated entries in the metadata template. According to some embodiments, the certification of the validated entries in the metadata template includes a duplicate term name check process to check terms in the metadata template against existing terms in the enterprise metadata repository. Note that the certification might be associated with a level of integrity of definitions (e.g., indicating that a data steward has confirmed that the data is sufficient and consistent at least within a given project, domain, enterprise, etc.).

At S260, the back-end application computer server may load the set of certified metadata entries, including the certified data element names and certified data element definitions, into the enterprise metadata repository data store. This might comprise, for example, loading certified data element master names, associated certified data element definitions, and certified data element component names. At S270, the back-end application computer server may exchange electronic messages, including messages exchanged via a distributed communication network, supporting at least one interactive user interface display associated with certification of the metadata template. According to some embodiments, the interactive user interface display is associated with spreadsheet application having multiple tabs and macros. In this case, the interactive user interface display might provide macro transfer validation term counts for steward work area master names, steward work area components, individual tab master names, and individual tab components.

According to some embodiments, the metadata template includes a scope overview and at least one content owner name, and, for that content owner name, content owner contact information, a role, applicable tab name, and applicable column headings. Similarly, the metadata template could include a date initiated and at least one authorization signature name and, for that authorization signature name, a role, applicable tab name, and signature date.

Figure 3:
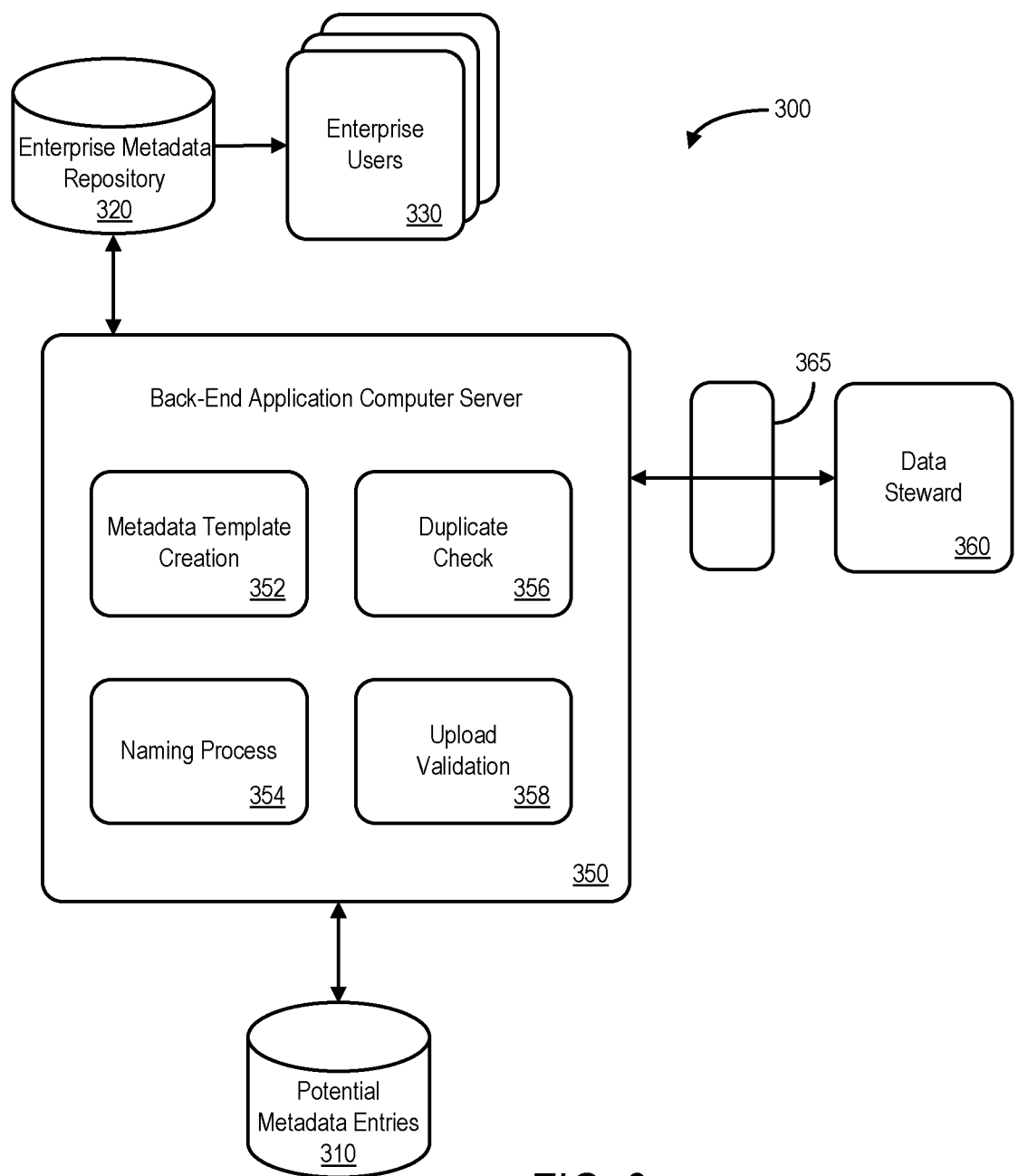
FIG. 3 is a high-level block diagram of an enterprise system according to some embodiments of the present invention.

Note that embodiments described herein may be utilized by different types of enterprises. For example, FIG. 3 is a high-level block diagram of an insurance enterprise system 300 according to some embodiments of the present invention. As before, the system 300 includes an enterprise back-end application computer server 350 associated with an insurance enterprise that may access a potential metadata entries data store 310 (e.g., each record representing a definition provided by a data steward 360 via a firewall 365 to be eventually uploaded to an insurance enterprise metadata repository 320). After being uploaded, the definitions may be accessed from the enterprise metadata repository by enterprise users or members of a "Wiki"-like dictionary or database. As used herein, the term "Wiki" may refer to a website or other interface that provides collaborative modification of its content and structure (e.g., directly from a web browser). The Wiki may include text written using a simplified markup language (such as "Wiki markup"). A Wiki might be run using wiki software or a wiki engine.

According to some embodiments, the back-end application computer server 350 includes a metadata template creation process 352, a naming process 354, a duplicate check process 356, and an upload validation process 358. In this way, the system may provide the categories of business terms and definitions as well as levels of certification. Note that without names and definitions, a decision maker might not know what he or she is looking at. According to some embodiments, data quality business requirements may set standards used to judge acceptable levels of quality for critical data elements (at a minimum) and identify how complete, valid, unique, or otherwise robust the data elements must be. Note that data that accurately reflects the reality of customers, enterprise, marketplace, and real-world facilitates accurate enterprise decisions.

The back-end application computer server 350 may let project teams track, manage, and certify data element names, definitions and other related business metadata needed in project development. For example, it might be certified that a name and definition of a data element confirms to a business data naming standard, the name matches the definition, and the definition accurately defines the expected data in terms of its enterprise-related content. The back-end application computer server 350 may help with the proper management and stewardship of project data and may contain multiple templates (e.g., associated with spreadsheet application "tabs") to collect and organize business metadata. Note that the tabs within a template may expedite data collection activities and prepare for an easier entry of enterprise metadata into the enterprise metadata repository 320. As a result, an amount of "scrap and rework" caused by data elements not being named and defined clearly, properly, and consistently before design and building phases of a project may be reduced. Moreover, the repository 320 may provide common and consistent vocabulary with common meanings utilized not only across enterprise project team members, but also from front end to back end reporting systems.

Figure 4:
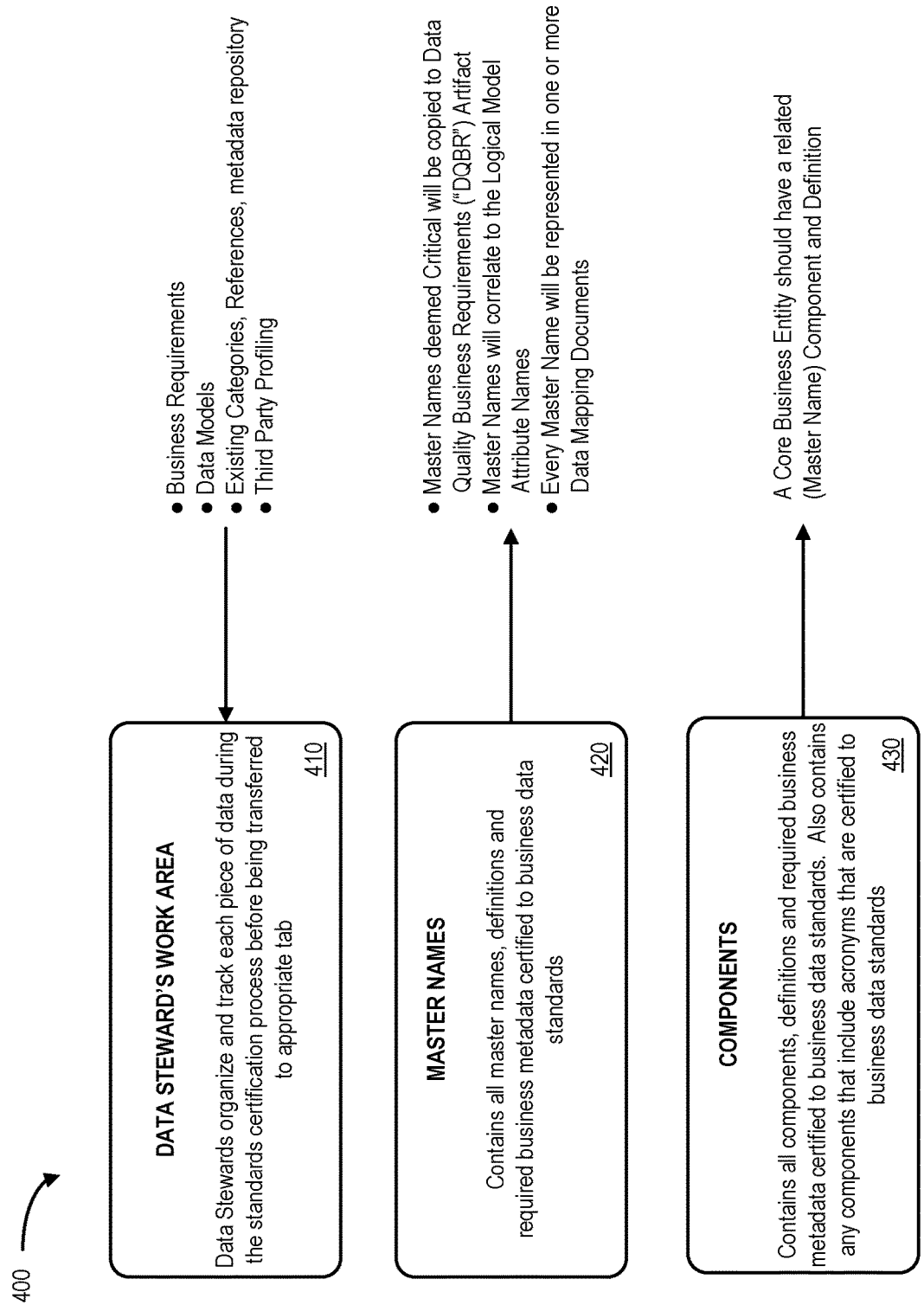
FIG. 4 illustrates inputs and outputs associated with an enterprise metadata repository according to some embodiments.

FIG. 4 provides a high-level overview 400 of inputs and outputs that may be associated with embodiments of the present invention. In particular, the overview 400 includes three main tabs or templates 410, 420, 430. The first tab is a data steward's work area 410 (described in detail with respect to FIG. 5) which may be used by data stewards to organize and track each piece of data during a standards certification process before being transferred to appropriate tab. The data input to the steward's work area 410 might include, for example: business requirements; data models; existing categories, references, metadata repository; and/or third party profiling (e.g., describing an entity). The second tab is master names 420 (described in detail with respect to FIG. 7) which may contain all master names, definitions and required business metadata certified to business data standards. For example, an element might be certified that the name and definition of the data element conform to a business data naming standard, the name matches the definition, and the definition accurately defines the expected data in terms of its business content. The third tab is components 430 (described in detail with respect to FIG. 8) that may contain all components, definitions and required business metadata certified to business data standards. The components 430 may also contain any components that include acronyms that are certified to business data standards.

According to some embodiments, a metadata collection system contains a series of tabs, each with its own purpose; some might be required and some might be optional. On tabs from which metadata is loaded to the repository, the first row might indicate if population of the column is required for the load and whether, if populated, the information will be loaded to the metadata repository. Note that these requirements might not always be the same and may vary depending on whether the entry is to add a new term, change an existing term, or reuse an existing term. One example of a tab might be an optional cover sheet that lets a project data steward begin to set up deliverable details for a project. Similarly, a "read me" tab might provide a quick reference that helps with population of the metadata collection system by showing the purpose and description of each tab, what is required for the metadata to load based on each action description, what is actually loaded, any helpful notes, etc. Another tab that might be provided is a document revision tab to ensure that all revisions are appropriately tracked. Still another optional tab that might be provided is a scope overview and content owners tab for an overview of the scope of what is being captured within a deliverable. Similarly, an optional signatures and authorization tab might capture information about who provided authorization, what was authorized, and when authorization was obtained.

According to some embodiments, a data steward's work area might be associated with a display where stewards and other project team members can begin the certification process of data element names and definitions needed in the project. Note that there may be multiple definitions and names that exist for a piece of data; this workspace may allow for the coordination and central tracking needed before certification occurs. While this tab might not be required for upload to a metadata repository, entering information into this tab may help enable utilization of the macros that have been built to help make population of the required tabs easier. For example, FIG. 5 illustrates an interactive user interface data steward's work area display 500 in accordance with some embodiments.

The project display 500 is where the certification process of data element names and definitions begins. The display 500 allows for coordination and central tracking of data and sets the common space for the collection and documentation of known/existing names and definitions, valid values, etc. According to some embodiments, data stewards and project teams may use this display 500 to enter data, organize and track the status for each piece of data before names and definitions are certified and are ready to be entered/transferred into the other tabs (displays). Columns that are not needed may be hidden or additional columns that are needed may be added (to the right at the end) of the spreadsheet to customize based on individual/domain processes. A combination of roles (data architects, data modelers, business subject matter experts, data stewards, etc.) may enter data into the display 500 via a table 510 tab for the steward to coordinate. Once names and definitions are certified (e.g., to at least an application level: master names and corresponding information are moved to the master names tab; components and corresponding information are moved to the components tab; components with acronyms and corresponding information are moved to the components tab; and macros (that have been incorporated into the template) may be executed to facilitate movement/population. Note that a finalized metadata collection system file may be submitted to a domain data steward for review prior to loading the dictionary to the metadata repository.

Note that the information illustrated in FIG. 5 (e.g., the columns in the table) are provided only as an example, and the data steward's work area display 500 might include additional/other information. For example, the display 500 might include: an "owner" who owns the next task to drive to completion (which, if populated, will not be transferred by a macro to another applicable tab); a "reference number" representing a sequential number to be used by the stewards for internal project tracking (which, if populated, will not be transferred by a macro to another applicable tab); a "certification notes" comprising a free-form text that documents any issues, notes on the certification process or status for a term or action requested (which, if populated, will not be transferred by a macro to another applicable tab); a "term and/or definition source/origin" showing where the term and/or definition came from or originated (e.g., where were existing definitions found?); a "derivation" comprising a statement or computation of the function/rules which will be leveraged to calculate/determine the valid values of the data element; an "action description" describing the action to take when loading a term to the metadata repository (selected via a drop down box (which, if populated, will be automatically transferred by a macro to another applicable tab); and a "term type name" providing the name of the type of term that is associated with the Term Name (e.g., master name or component) (which, if populated, will be automatically transferred by a macro to another applicable tab).

As other examples, the table 510 may include a "term name" indicating either a new term name or an existing term name whether this is a new term (which, if populated, will be transferred by a macro to another applicable tab) and an "acronym" (which, if populated, will be transferred by a macro to another applicable tab). If a new component is added and the acronym field is populated, the macro may concatenate the information to create a combined version of the component and acronym in the format of "Component (Acronym)" on the component tab. The table 510 may further include an "existing term definition" providing an definition as it currently exists or a new definition (which, if populated, will be transferred by a macro to another applicable tab). If "action" is "reuse with change" (and nothing is entered in "proposed term definition" column) or "reuse as is," this will be transferred by a macro to another applicable tab. The table 510 may further include a "data stewardship certification level name" that may have a drop down menu used to select an appropriate data stewardship certification level (which, if populated, will be transferred by a macro to another applicable tab) and a "data quality business requirements indicator" denoting whether or not a term will be transferred to the data quality business requirements artifact and have quality rules written and implemented for the term (which, if populated, will be transferred by a macro to another applicable tab).

The table 510 may further include a "parent category name" such that, if a term was found in the metadata repository, document the parent category name. Note that components may automatically have a parent category of "component." (which, if a populated master name exists, will be transferred by a macro to another applicable tab). The table 510 may also have a "references category name" providing the name of the category that uses a term but does not own it and "related master name(s)" indicating the master name(s) to which the component term name is associated. Note that this may create a relationship between a master name(s) and its component parts in the metadata repository. Also note that one or more master names may be entered in one row to make multiple associations to a single component. When adding multiple entries in one row of this column, each master name might be separated by a comma. The table 510 may further include a "related master name parent category name(s)" providing the name of the parent category to which the related master name is assigned. This might be required to make the relationships between component(s) and master name(s) in the metadata repository. In addition, the table 510 might include "examples/samples" to capture known examples or sample data that will appear in the 'examples' field in the metadata repository and "term usage text" providing any helpful and descriptive information, calculations, derivations, history, etc., that will appear in a "usage" field of the metadata repository enabling readers to better understand the term (both of which, if populated, will be transferred by a macro to another applicable tab).

Figure 6:
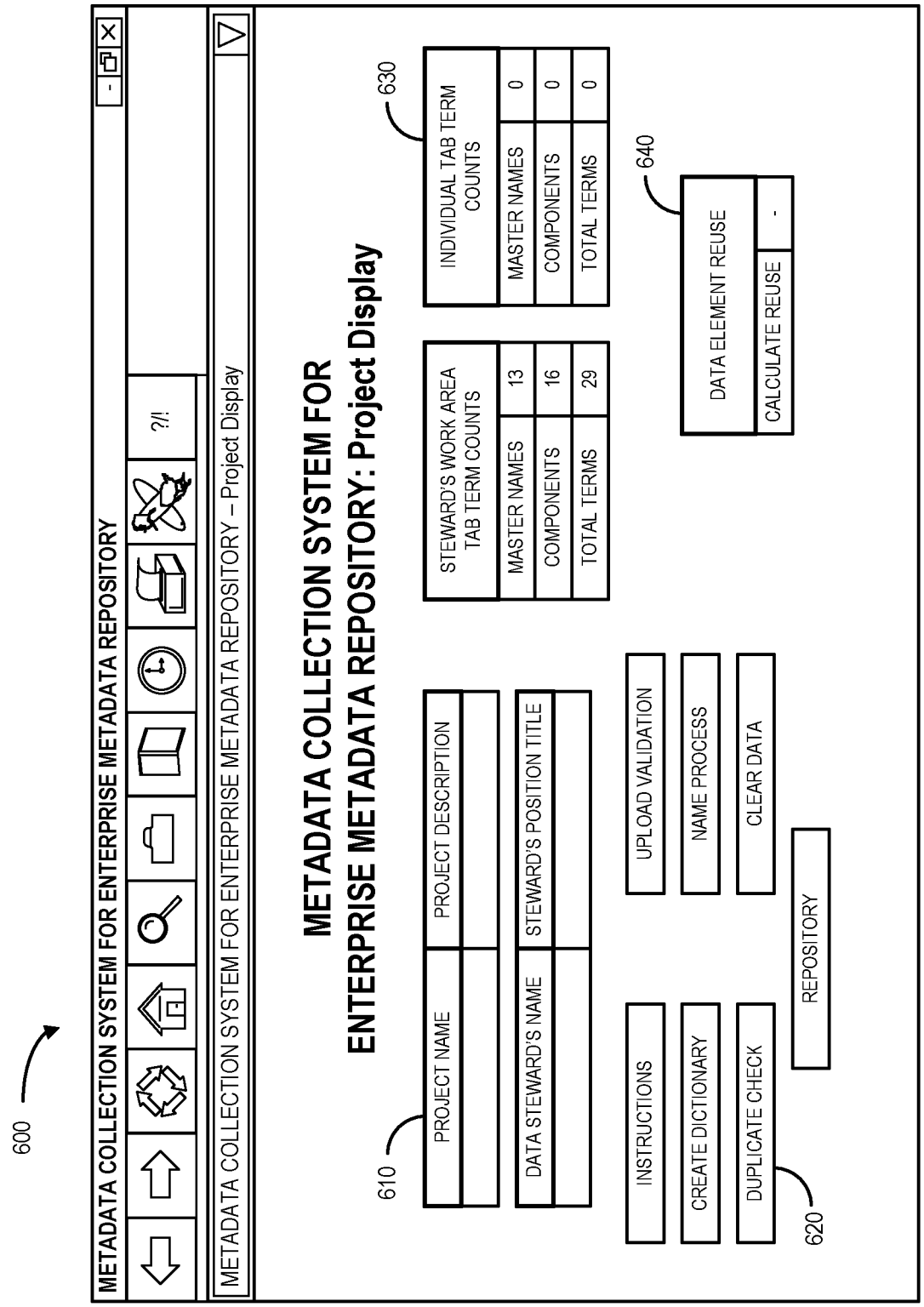
FIG. 6 illustrates an interactive user interface project display in accordance with some embodiments.

According to some embodiments, a project setup and macros display might be used to set up the metadata collection system for loading to the metadata repository and to enable the tracking of terms used in a project/project phase(s) in the metadata repository. This tab might also be a "home base" for the macros that have been incorporated to help facilitate population and preparation of the template to be submitted to the metadata repository. For example, FIG. 6 illustrates an interactive user interface project display 600 in accordance with some embodiments. According to some embodiments, project details 610 on the display 600 assist data stewards and the data governance council in tracking, reporting, and processing metrics for their data assets. In addition, there are several buttons 620 on this display 600 that launch macros which were designed to help facilitate population and preparation of the template for loading to the metadata repository, including: transfer certain information entered in the steward's work area to each applicable tab; create abbreviated and/or full business-facing names for new terms and transfer them to the master names tab; validate that the submission will "pass" metadata repository upload rules/requirements so the submission is not returned; and/or check for existing terms in the metadata repository (this might comprise only an exact match duplicate term name check, searching the metadata repository for existing terms might still be necessary); clear the contents of the template. The display 600 might also include macro validation totals 630 and/or data element reuse information 640. That is, after running the macro, these counts may enable users to verify that the total number of terms entered on the steward's work area tab is equal to the total number of terms entered on the individual tabs (these counts should always match). According to some embodiments, master name and component counts by action are available to provide support for scorecard metrics (for the action descriptions "reuse with change" and "reuse as is").

With respect to the project details 610 on the display, a "project description" might provide a description of the collection and the objective/business need the collection was initiated to satisfy. According to some embodiments, this project detail 610 may be required for all entries related to projects and to update existing projects that were previously created without a description. A "project name: might represent a name of the project for which the terms are being created/reused (and this may also be the name of the collection to which term(s) are associated). A "project qualifier name" might be provided if a collection has multiple phases or has sub-collections, each with their own metadata collection system and a subset grouping of term entries is required/needed. A "steward name" may provide a name of a data steward or the person playing the role of data steward populating the metadata collection system (e.g., the name of the metadata collection system creator) and a "position title" might indicate a job title of a person filling out the artifact (e.g., the role of the data steward or the person playing the role of data steward). A "project domain" might define an area or domain of the project where the data steward or person playing the role of data steward works With respect to the buttons 620 on the display 600, an "instructions" selection may take a user to a tab with tips and instructions for the various macros incorporated in the template. A "create dictionary" selection might be run, after the steward's work area has been completed, to transfer certain information to the applicable tab in the template. A "duplicate check" selection might be used, prior to creating a metadata work request, to identify exact matches of existing term names in the metadata repository that will impede the upload and cause the submission to be rejected. An "upload validation" selection" may be used, prior to creating a metadata work request, to identify any issues that will impede the metadata repository upload and cause the submission to be rejected. A "name process" selection may be run, after creating a metadata collection system macro, to take a user to another tab where an enterprise facing name/physical name tool can be run. Once complete, the information can be transferred to the master name tab. A "clear data" selection may clear all information created from macros. That is, selection might clear all tabs except the steward's work area tab and project information 610 on the project display 600. A "repository" selection may open a browser session to take user to the enterprise metadata repository home page to conduct additional searches to ensure that existing terms are not duplicated.

According to some embodiments, a master names display may contain the master names and definitions that are certified to business data standards and be used to capture other required and optional additional business metadata to be loaded to the metadata repository. For example, FIG. 7 illustrates an interactive user interface master name and definitions display 700 according to some embodiments. According to some embodiments, other project team members will utilize this display 700 in relation to other operating model artifacts. Moreover, all master names deemed critical (i.e., marked "yes" in a data quality business requirements indicator column of a master names table 710) will be copied to the data quality business requirements artifact. According to some embodiments, master names may correlate to logical data model attribute names and every master name should be represented in one or more data mapping documents being created in the project.

Note that the information illustrated in FIG. 7 (e.g., the columns in the table 710) are provided only as an example, and the master name and definitions display 700 might include additional/other information. For example, the display 700 might include: "certification notes" comprising free-form text that documents any issues or other notes on the certification process or status for a term name (and will not be transferred from steward's work area after running macro); an "entry date" indicating the date on which a term on this tab has been certified (e.g., to let project teams filter on what terms are "good to use" (certified) and what terms are still pending certification); a metadata collection system id comprising a unique, sequence-assigned number that identifies a term name (and will not be transferred from steward's work area after running macro); and a "master name" that identifies a data element that can be expressed (implemented) as a physical data element. Note that a master name may comprise a fully written-out, mixed case English-language name having no acronyms or abbreviations. The first letter of each word in the master name may be capitalized and might be required to not contain an acronym. The master name will be transferred from steward's work area after running macro. A "related class word" represents class word that the master name ends with. A class word may be a term that categorizes data according to the type represented, such as code, identifier, indicator, etc. According to some embodiments, every master name must end with a class word. If this field was not populated after running the macro, a data steward may be asked to use a drop down box to select the applicable class word. A "master name definition" may provide a formal statement of the essential meaning/significance of a data element using the certified definition in business language for the term (and will be transferred from steward's work area after running macro in some cases).

The table 710 may further include a "parent category name" providing the name of the category that owns a term. This may be, for example, either the assigned parent category in the metadata repository for an existing term or the parent category of the area creating a new term. The table 710 may also include a referencing category name comprising the name of the category that uses a term but does not own it (and will be transferred from steward's work area after running macro). A "data stewardship certification level name" may be the name that identifies the degree to which a term and its definition have been verified and administered by a data steward or group of stewards (and will be transferred from steward's work area after running macro in some case). A "data quality business requirements indicator" may comprise an indicator denoting whether or not a term will be transferred to the data quality business requirements artifact and have quality rules written and implemented for the term (and will be transferred from steward's work area after running macro).

According to some embodiments, an abbreviated Enterprise-Facing Name ("EFN") may represent a shortened name (e.g., 30 characters or less) to be used in when a full business-facing name is too long. Note that, in some embodiments, an EFN might be provided for master names (without being provided for component names). For example, the EFN might be appropriate on screens where space constraints are present or for technical abbreviations to ensure consistency. According to some embodiments, an EFN/NSM macro may be used to create and transfer abbreviated EFN to this tab. The table 710 may further include a full EFN to be used on reports/screens/universes where maximum readability is an asset and space is not an issue. The table 710 may further include "examples/samples" that capture known examples or sample data that will appear in the metadata repository in the 'examples' field of a term (and will be transferred from steward's work area after running macro). In addition, the table 710 may include "term usage text" that is used to capture any helpful/descriptive information, calculations, derivations, history, etc. that would enable readers to better understand the term (e.g., to appear in the metadata repository in "usage" field of a term)(and will be transferred from steward's work area after running macro). The table 710 might also include "additional columns (blank column)" that acts to separate the standard master name requirements template from any additional columns/info that may be needed for a project. According to some embodiments, columns may be added to the right of this separator, but not before it.

Figure 8:
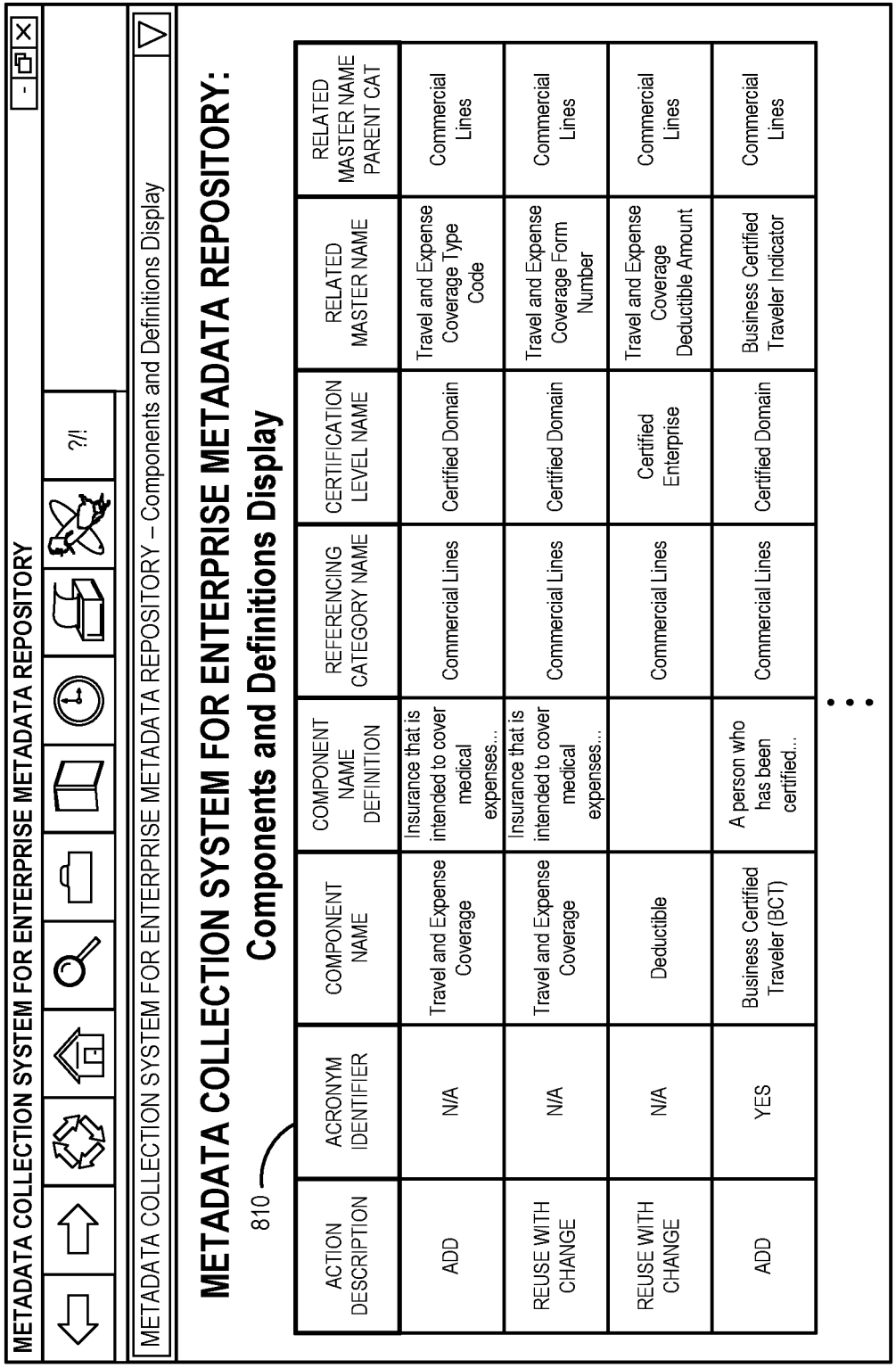
FIG. 8 illustrates an interactive user interface components and definitions display in accordance with some embodiments.

According to some embodiments, a components tab may contains the components and definitions that are certified to business data standards and that capture other required and optional additional business metadata to be loaded to the metadata repository. This tab may also contain the components which include acronyms that follow stewardship protocols to be loaded to the metadata repository. These components may represent the building blocks of one foundational enterprise vocabulary. For example, FIG. 8 illustrates an interactive user interface components and definitions display 800 in accordance with some embodiments. The components and definitions display 800 may contain all of the components, corresponding definitions, and other business metadata related to a term (once certified to at least the application level) and may be used to upload metadata to the repository.

Note that the information illustrated in FIG. 8 (e.g., the columns in the table 810) are provided only as an example, and the components and definitions display 800 might include additional/other information. For example, the display 800 might include: an "action description" representing a description of the action to take when loading a term to the metadata repository (and will be transferred from steward's work area after running macro); an "acronym indicator" that indicates whether or not the term includes an acronym in the component name (if "yes," it will be marked in the repository as both component and acronym. if "n/a," only term type of component will be applied) (and will be transferred from steward's work area after running macro if the actions is "add," the term type is "component," and the acronym field is populated); and a "component name" representing a word or set of words that describes an item or concept that is part of a master name. Note that components are the building blocks, or the controlled vocabulary, with which master names are created. A component may be one word, a compound expression, or include an acronym. A component is a term that cannot be decomposed further without losing important information about the business (example, "AAA Member")(and will be transferred from steward's work area after running macro). The table 810 may further include a "component name definition" which is a formal statement of the essential meaning or significance of a term that is a constituent part of a master name (and will be transferred from steward's work area after running macro in some cases).

According to some embodiments, the table 810 may include a "referencing category name" which is the name of the category that uses a term but does not own it (and will be transferred from steward's work area after running macro). The table 810 may further include a "data stewardship certification level name" representing a degree to which a term and its definition have been verified and administered by a data steward or group of stewards (and will be transferred from steward's work area after running macro "action" is "add," "reuse with change," or "reuse as is"). The table 810 might also include a "related master name" representing a master name to which the component term name(s) are associated. This may create the relationship between a master name and its component parts in the metadata repository (and will be transferred from steward's work area after running macro). The table 810 might further include a "related master name parent category name" associated with a name of the parent category to make the relationships between component(s) and master name(s) in the metadata repository (and will be transferred from steward's work area after running macro in some cases).

When using the metadata collection system according to some embodiments described herein, a data steward might first populate the project setup and macros tab with a project name and a project description. Once the project information has been entered, he or she may start populating the steward's work area tab. When the steward's work area is fully populated, he or she may run the create metadata collection system macro. A pop up box will appear to notify users when it has finished running. When the create metadata collection system macro has finished, the data steward may go back to the project setup and macros tab and select the "NAME PROCESS" icon. This will bring the steward to a hidden tab that contains buttons to convert master names on the master names tab to abbreviated EFNs and/or full EFNs. When macro(s) have finished running, the data steward may use the buttons to export the abbreviated and/or full EFNs to the applicable column(s) in the master names tab. He or she may then finish populating the master names, components and acronyms tabs, and run the upload validation macro. This may help ensure the submission will pass the metadata repository upload rules/requirements and prevent it from being returned for corrections prior to loading. The data steward may also run the duplicate term check to help ensure that terms entered in the template do not already exist in the metadata repository. Note that this might be an exact match validation and will only return results for terms that have been entered on the template in the exact way they appear in the metadata repository. As a result, a manual search of the metadata repository for existing terms might still be performed.

With respect to running the create metadata collection system macro, when the steward's work area tab is completely filled out, he or she may run the macro by clicking the "create dictionary" button on the project setup and macros tab to launch the macro. Each term and some of its attributes on the steward's work area tab will be copied over to its respective tab in the metadata collection system according to term type: master names or components. If populated, the following data for each entry will also be copied over to its respective tab: action description (add, reuse with change, reuse as is); term type name; term name; acronym (for components only); data quality business requirements indicator; parent category name (except for components); referencing categories; existing or proposed term definition; data stewardship certification level name; related master name (one or more may be entered; if multiple entries in one field, each master name must be separated by a comma); related master name parent category name (one or more may be entered; if multiple entries in one field, each parent category name must be separated by a comma); examples/samples (except for components); and term usage text (except for components).

After running the create metadata collection system macro, the steward will actively go into each tab and populate any remaining blank fields that are required for completing the entries and for uploading the information to the metadata repository. Note that there might be instances when data was not transferred. For example, attempts to "add" or "reuse with change" a master name or component that is enterprise certified might be blocked. Using a names process tab, the data steward may use an EFN/NSM macro to create and transfer abbreviated and/or full EFNs to the master names tab. If the related master name(s) field was populated on the steward's work area tab, the term names will have copied over to the appropriate field on the component's tab. If multiple related master names were entered (which must have been entered separated by commas) on the steward's work area tab for a specific term: each related master name will break out into its own row; if the action description for the component term is "add", the first row for that term will be "add" (note that the following rows for each related master name to the same component name will have the action description of "reuse with change"); and if more than one parent category name was entered in the related master name parent category name(s) field on the steward's work area tab, the data steward must adjust the related master name parent category name so it reflects the correct parent category name that the related master name is associated to. Once an entry is finalized, and the duplicate term check and upload validation macros have been run, the file might be sent to the domain data steward for review.

Figure 9:
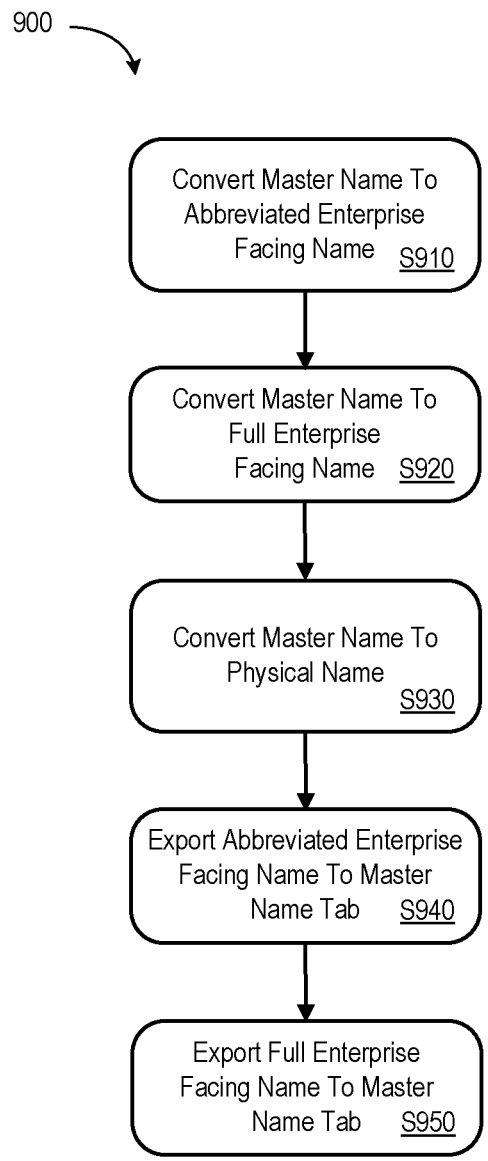
FIG. 9 illustrates a naming method according to some embodiments of the present invention.

Note that a purpose of a EFN may be to provide a consistent shortened form of a master name to be used across the enterprise on reports, application screens, and column headings. The EFN/NSM macro may automate the process of creating these abbreviations. FIG. 9 illustrates a naming method according to some embodiments of the present invention. Once the create metadata collection system macro has finished, the data steward may run the EFN/NSM macro. EFNs will be created for all master names entered with the action description "add" at S910, S920, S930 (creating the physical name associated with the element). If, after running the tool, new abbreviations are identified as being needed, an identification might be automatically transmitted to a data steward and/or user associated with the template. That is, execution of the tool might identify if any new abbreviations are needed. A steward can then submit a request to a business and technical abbreviations committee. The identification of the need for a new abbreviation may happen automatically, but in some embodiments the request is manually submitted by the steward.

Once EFNs have been created and reviewed, transfer the abbreviated EFN to the applicable column on the master names tab using the button provided at S940. According to some embodiments, full EFNs are optional. If creating these to load to the metadata repository, the data steward should use the button to transfer these names to the master names tab at S950. Note that any abbreviated EFNs exceeding 30 characters and full EFNs that exceed 50 characters might not be transferred to the master names tab.

With respect to naming conventions, a data management operating model might be implemented which includes a metadata collection system that is a vehicle for collecting definitions and names certified according to standards. The data naming architecture might provide a methodology for names and definitions to reach certification. In systems development there may be many things going on concurrently and iteratively, which means that communicating business data requirements effectively is important. Enforcing data naming standards provides consistency, reliability, and efficiency across an enterprise and may help members properly interpret the data being captured, processed, reported, and analyzed. A process that provides a controlled vocabulary which supports communicating business and technical data definition and names clearly and concisely may be desired. Because a consistent process is followed, an amount of rework that might occur throughout the project lifecycle may be reduced. Moreover, increases in integrity and understanding may be achieved for data that is delivered and shared across the enterprise. Inconsistency in vocabulary, on the other hand, results in communication difficulties. A naming process may be aligned with the metadata repository and the resulting business glossary may represent a foundational structure that can be consistently applied and reused across the enterprise. The resultant building blocks of the vocabulary may allow for business concepts, and the data related to those concepts, to be easily located within the metadata repository.

According to some embodiments, a defining and naming process may effectively support governed metadata and may include: defining and naming process; identifying the need to define a new or existing data element; identifying the class word; defining a data element; defining component terms; crafting the master data name; creating EFNs; and/or listing valid values and their descriptions.

With respect to data stewardship certification levels, a "certified—enterprise" level may represent agreement on the name and definition was reached by a domain data stewardship group and certified as useable across the enterprise (where applicable). If a data name and definition is certified at this level, it may be used by all business areas and by all it project/maintenance teams. A "certified—domain" level may mean that the term and its definition have been certified for use within a line of business, operational business unit and/or domain level only. One may refer to the parent category and referencing categories name to determine the domain(s) for which the name and definition is certified. A "certified—application" level may mean that the term and its definition have been certified for use within a project or application only. One may refer to the parent category name to determine the domain to which the project/application applies. An "obsolete" level may mean that the term name and definition should not be used for new development (because the data itself is obsolete).

Figure 10:
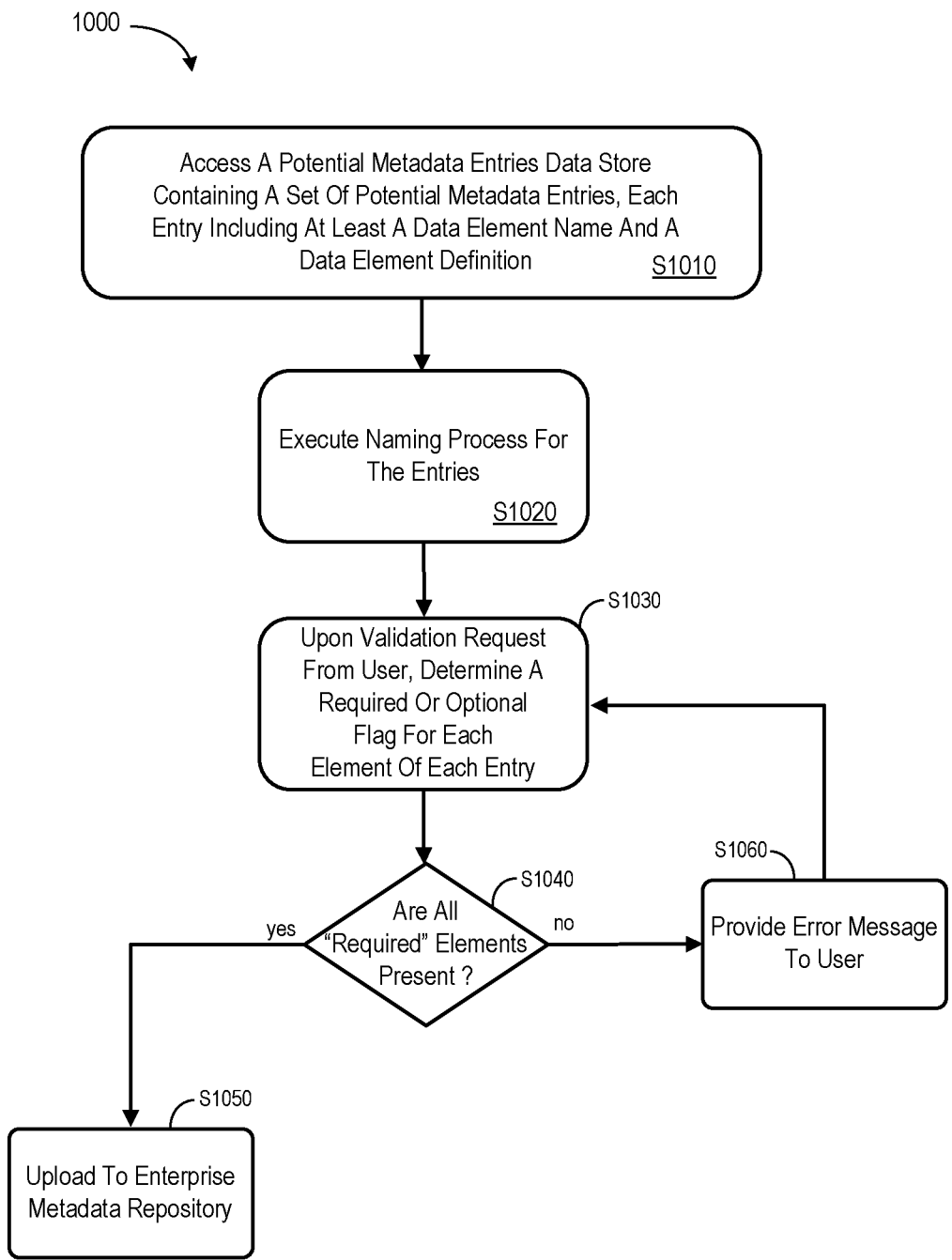
FIG. 10 illustrates an upload validation method according to some embodiments of the present invention.

One validation step that might be performed in accordance with some embodiments described herein is checking to ensure that all required fields are included in a file uploaded to an enterprise metadata repository. FIG. 10 is an example of a method according to some embodiments. At S1010, a metadata collection system may access a potential metadata entries data store containing a set of potential metadata entries. Each entry may include, for example, at least a data element name and a data element definition. At S1020, a naming process may be executed for the entries. For example, an EFN might be generated for each entry. Upon a validation request from a user, a "required" or "optional" flag might be determined for each data element for each entry at S1030. If a required field is not populated at S1040, an error message is provided to the user at S1060 (e.g., indicating which field was not populated) and the process continues at S1030. If all required fields were populated at S1040, the entries are uploaded to an enterprise metadata repository at S1050.

Figure 11:
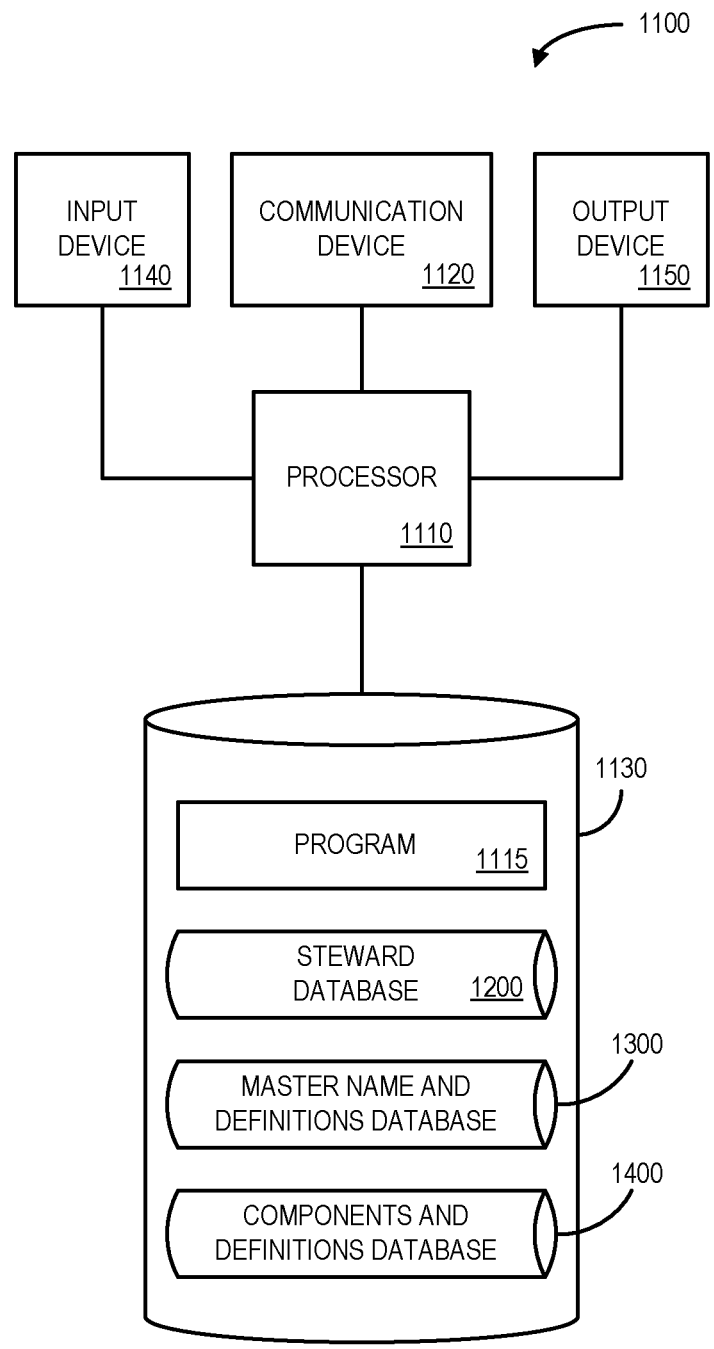
FIG. 11 is a block diagram of an apparatus in accordance with some embodiments of the present invention.

Embodiments described herein may comprise a tool that helps prepare metadata for uploading and may be implemented using any number of different hardware configurations. For example, FIG. 11 illustrates a back-end application computer server 1100 that may be, for example, associated with the systems 100, 300 of FIGS. 1 and 3, respectively. The back-end application computer server 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote administrator or underwriter computers and/or communication devices (e.g., PCs and smartphones). Note that communications exchanged via the communication device 1120 may utilize security features, such as those between a public internet user and an internal network of an insurance enterprise. The security features might be associated with, for example, web servers, firewalls, and/or PCI infrastructure. The back-end application computer server 1100 further includes an input device 1140 (e.g., a mouse and/or keyboard to enter information about metadata, names, definitions, etc.) and an output device 1150 (e.g., to output error messages, upload data, generate reports regarding metadata status, etc.).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1115 and/or a dispatch tool or application for controlling the processor 1110. The processor 1110 performs instructions of the program 1115, and thereby operates in accordance with any of the embodiments described herein. For example, the processor 1110 may access a potential metadata entries data store containing a set of potential metadata entries, each entry including at least a data element name and a data element definition. The processor 1110 may automatically populate a metadata template based on the set of potential metadata entries. The processor 1110 may update entries in the metadata template using a translation tool and validate the updated entries in the metadata template to ensure that required data elements are present. The processor 1110 may also certify the validated entries load the set of certified metadata entries, including the certified data element names and certified data element definitions, into an enterprise metadata repository data store. Electronic messages may be exchanged by processor 1110 to support at least one interactive user interface display associated with certification of the metadata template.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the back-end application computer server 1100 from another device; or (ii) a software application or module within the back-end application computer server 1100 from another software application, module, or any other source.

In some embodiments (such as shown in FIG. 11), the storage device 1130 further stores a steward database 1200, a master name and definitions database 1300, and components and definitions database 1400. An example of databases that might be used in connection with the back-end application computer server 1100 will now be described in detail with respect to FIGS. 12 through 14. Note that the databases described herein are only examples, and additional and/or different information may be stored therein. Moreover, various databases might be split or combined in accordance with any of the embodiments described herein. For example, the steward database 1200 and/or master name and definitions database 1300 might be combined and/or linked to each other within the program 1115.

Figure 12:
FIG. 12 is a portion of a tabular data steward database in accordance with some embodiments.

Referring to FIG. 12, a table is shown that represents the steward database 1200 that may be stored at the back-end application computer server 1100 according to some embodiments. The table may include, for example, entries identifying terms (e.g., names and definitions) that a data steward would like to potentially upload to an enterprise metadata repository. The table may also define fields 1202, 1204, 1206, 1208, 1210, 1212 for each of the entries. The fields 1202, 1204, 1206, 1208, 1210, 1212 may, according to some embodiments, specify: a steward's work area identifier 1202, an action description 1204, a term type name 1206, a term name 1208, a proposed term definition 1210, and a parent category name 1212. The steward database 1200 may be created and updated, for example, based on information electrically received from remote steward devices. The steward's work area identifier 1202 may be, for example, a unique alphanumeric code identifying an entry that has been provided by a data steward. The action description 1204 might describe an action to take when loading a term to a metadata repository (e.g., "add," "re-use as is," or "re-use with changes"). The term type name 1206 might indicate the term associated with the term name (e.g., and be selected from a "Master Name" and "Component" drop down menu). The term name 1208 and proposed term definition 1210 describe what the term means and the parent category name 1212 might be used when a term was found in the metadata repository.

Figure 13:
FIG. 13 is a portion of a tabular master name and definitions database in accordance with some embodiments.

Referring to FIG. 13, a table is shown that represents the master name and definitions database 1300 that may be stored at the back-end application computer server 1100 according to some embodiments. The table may include, for example, entries identifying names that a data steward would like to potentially upload to an enterprise metadata repository. The table may also define fields 1302, 1304, 1306, 1308, 1310, 1312 for each of the entries. The fields 1302, 1304, 1306, 1308, 1310, 1312 may, according to some embodiments, specify: a master identifier 1302, certification notes 1304, an entry date 1306, an action description 1308, a master name 1310, and a master name definition 1312. The master name and definitions database 1300 may be created and updated, for example, automatically by a macro based on information electrically received from remote steward devices. The master identifier 1302 may be, for example, a unique alphanumeric code identifying a master name that has been provided by a data steward. The certification notes 1304 might comprise free-form text that documents any issues or other notes about the certification process or status of a term name. The entry date 1306 might indicate when the term was entered into the system (or last updated). The action description 1308 might describe an action to take when loading a term to a metadata repository (e.g., "add," "re-use as is," or "re-use with changes"). The master name 1310 and master name definition 1312 describe what the term means.

Referring to FIG. 14, a table is shown that represents the components and definitions database 1400 that may be stored at the back-end application computer server 1100 according to some embodiments. The table may include, for example, entries identifying components that a data steward would like to potentially upload to an enterprise metadata repository. The table may also define fields 1402, 1404, 1406, 1408, 1410, 1412 for each of the entries. The fields 1402, 1404, 1406, 1408, 1410, 1412 may, according to some embodiments, specify: a component identifier 1402, an action description 1404, an acronym identifier 1406, a component name 1408, a component name definition 1410, and a referencing category name 1412. The component database 1400 may be created and updated, for example, automatically by a macro based on information electrically received from remote steward devices. The component identifier 1402 may be, for example, a unique alphanumeric code identifying a component that has been provided by a data steward. The action description 1404 might describe an action to take when loading a term to a metadata repository (e.g., "add," "re-use as is," or "re-use with changes"). The acronym identifier 1406 might indicate whether or not the term includes an acronym in the component name. The component name 1408 and component name definition 1410 describe what the term means and the referencing category name 1412 might represent the name of the category that uses a term but does not own it (as selected from a drop down box).

Thus, embodiments may provide an automated and efficient way to review and/or adjust metadata before the information is uploaded to an enterprise metadata repository. This may help reduce the number of submissions that are rejected, improve the accuracy and completeness of the repository, etc.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 15:
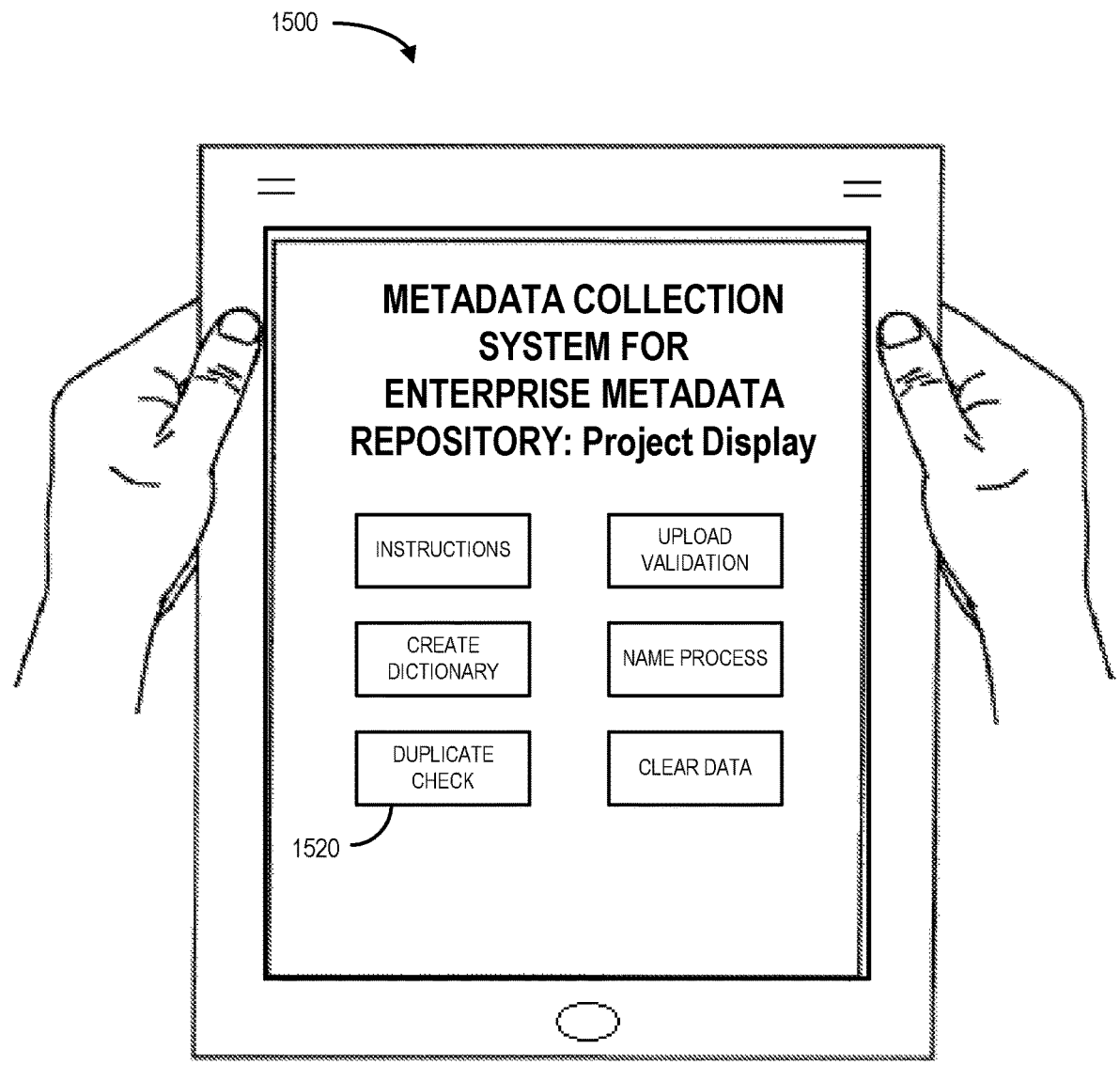
FIG. 15 illustrates a handheld tablet device displaying metadata collection system information according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or any of the embodiments might be implemented using a cloud based computing platform). Moreover, although embodiments have been described with respect to particular types of metadata, embodiments may instead be associated with other types of metadata (e.g., additional information might be collected and/or automatically generated about master names, components, etc.). Still further, the displays and devices illustrated herein are only provided as examples, and embodiments may be associated with any other types of user interfaces. For example, FIG. 15 illustrates a handheld touchscreen tablet computer 1500 displaying an interactive metadata collection system display according to some embodiments. In particular, the display includes buttons 1520 that might be selected by a user to provide information, review and/or adjust entries, and/or upload information to an enterprise repository.

Figure 16:
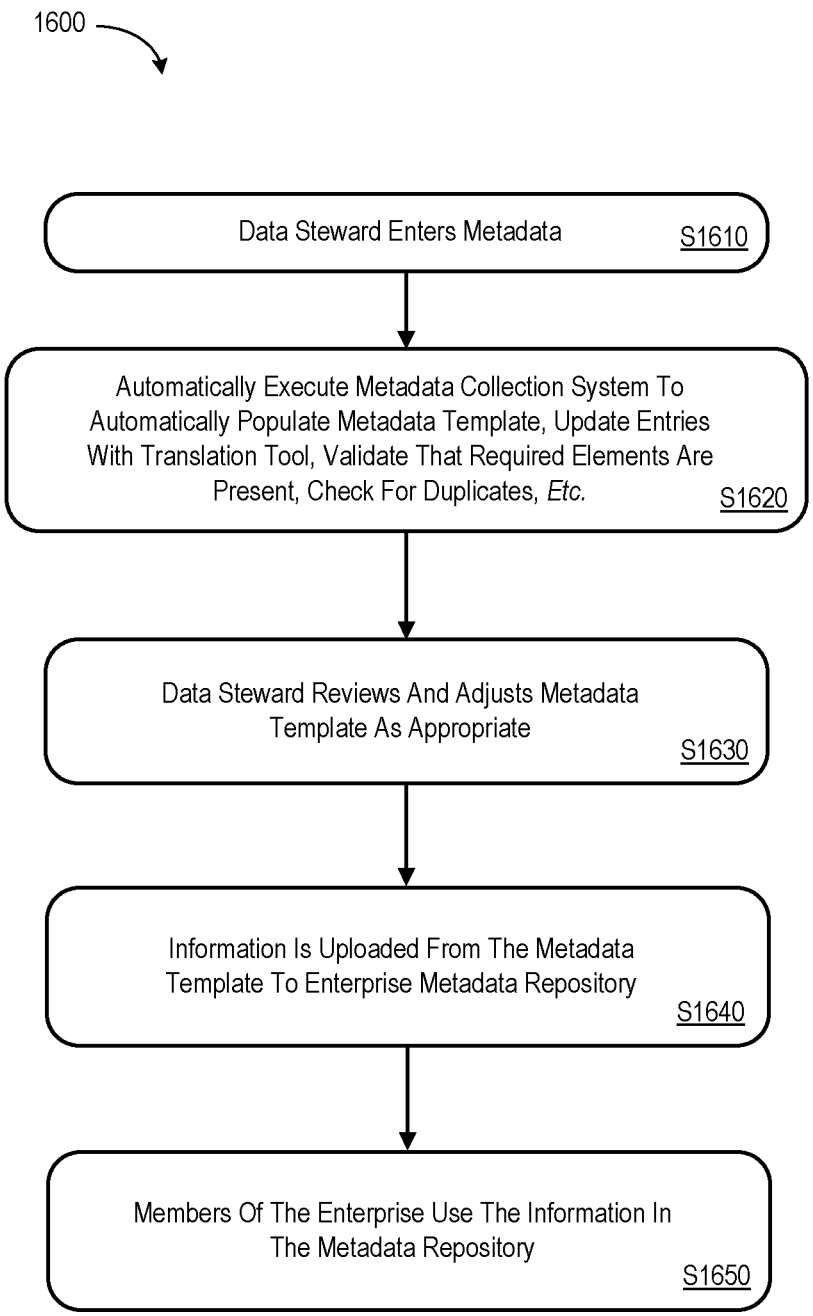
FIG. 16 illustrates an overall insurance enterprise workflow in accordance with some embodiments.

Note that embodiments described herein might be used in connection with a number of different types of business process flows. For example, FIG. 16 illustrates an overall process 1600 in accordance with some embodiments. At S1610, a data steward may enter metadata (e.g., names and definitions of data associated with an enterprise). At S1620, a metadata collection system may be executed to automatically populate a metadata template, update entries with a translation tool, validate that required elements are present, check of updates, etc. in accordance with any of the embodiments described herein. At S1630, the data steward may review and adjust the metadata as appropriate (e.g., to complete missing fields that are mandatory). At S1640, information is uploaded from the metadata template to an enterprise metadata repository. At S1650, members of the enterprise may use the information in the metadata repository (e.g., when writing software code, creating contracts or user guides, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to load information into an enterprise metadata repository data store via an automated back-end application computer server, comprising:
   (a) the enterprise metadata repository data store coupled to devices associated with members of the enterprise;
   (b) an available metadata entries data store containing a set of available metadata entries, entries including data element master names associated with data element definitions and data element component names representing a portion of a master name;
   (c) the back-end application computer server, coupled to the enterprise metadata repository and available metadata entries data stores, programmed to:

(i) access the set of available metadata entries from the available metadata entries data store, (ii) execute a metadata collection system to automatically populate, based on the set of available metadata entries, a metadata template associated with a project and including: a project identifier, a project name, a repository identifier, a project description, and a steward identifier, (iii) update entries in the metadata template using a translation tool by:
converting a master name to an abbreviated enterprise facing name,
converting the master name to a full enterprise facing name, and
converting the master name to a physical name, (iv) validate the updated entries in the metadata template to ensure that required data elements are present, (v) certify the validated entries in the metadata template, and (vi) load the set of certified metadata entries, including certified data element master names, associated certified data element definitions, and certified data element component names into the enterprise metadata repository data store; and (d) a communication port coupled to the back-end application computer server to facilitate an exchange of electronic messages, including messages exchanged via a distributed communication network, supporting at least one interactive user interface display associated with certification of the metadata template and a spreadsheet application having multiple tabs and macros, wherein said interactive user interface display provides macro transfer validation term counts for steward work area master names based on the data steward identifier, steward work area components based on the data steward identifier, individual tab master names, and individual tab components, and further wherein an interactive user interface data steward's work area display includes a data stewardship certification level name selected via a drop down menu that includes: a certified domain basis; a certified enterprise basis; and a certified project basis.

2. The system of claim 1, wherein the metadata template further includes: (i) a steward name, (ii) a steward position title, and (iii) a project domain.

3. The system of claim 1, wherein the metadata template includes at least five of: (i) an owner, (ii) a reference number, (iii) an action requested/certification notes, (iv) a definition source or origin, (v) a derivation, (vi) an action description, (vii) a term type name, (viii) a term name, (ix) an acronym, (x) an existing term definition, (xi) a proposed term definition, (xii) the data stewardship certification level name, (xiii) a data quality business requirements indicator, (xiv) a parent category name, (xv) a referencing category name, (xvi) a related master name, (xvii) a related master name parent category name, (xviii) an example or sample, and (xix) term usage text.

4. The system of claim 1, wherein the certification of the validated entries in the metadata template includes a duplicate term name check process to check terms in the metadata template against existing terms in the enterprise metadata repository.

5. The system of claim 1, wherein the metadata template includes at least five of: (i) certification notes, (ii) an entry date, (iii) a metadata collection system identifier, (iv) an action description, (v) a master name, (vi) a related class word, (vii) a master name definition, (viii) a parent category name, (ix) a referencing category name, (x) the data stewardship certification level name, (xi) a data quality business requirements indication, (xii) the abbreviated enterprise facing name, (xiii) the full enterprise facing name, (xiv) an example or sample, and (xv) term usage text.

6. The system of claim 1, wherein the metadata template includes a scope overview and at least one content owner name, and, for that content owner name, content owner contact information, a role, applicable tab name, and applicable column headings.

7. The system of claim 6, wherein the metadata template includes a date initiated and at least one authorization signature name and, for that authorization signature name, a role, applicable tab name, and signature date.

8. A computerized method to load information into an enterprise metadata repository data store via an automated back-end application computer server, comprising:
accessing an available metadata entries data store containing a set of available metadata entries, each entry including at least a data element name and a data element definition;
executing, by a back-end application computer server, a metadata collection system to automatically populate, based on the set of available metadata entries, a metadata template associated with a project and including: a project identifier, a project name, a repository identifier, a project description, and a data steward identifier;
updating, by the back-end application computer server, entries in the metadata template using a translation tool by:
converting a master name to an abbreviated enterprise facing name,
converting the master name to a full enterprise facing name, and
converting the master name to a physical name;
validating, by the back-end application computer server, the updated entries in the metadata template to ensure that required data elements are present,
certifying, by the back-end application computer server, the validated entries in the metadata template;
loading, by the back-end application computer server, the set of certified metadata entries, including the certified data element names and certified data element definitions, into the enterprise metadata repository data store; and
exchanging electronic messages, including messages exchanged via a distributed communication network, supporting at least one interactive user interface display associated with certification of the metadata template and a spreadsheet application having multiple tabs and macros, wherein said interactive user interface display provides macro transfer validation term counts for steward work area master names based on the data steward identifier, steward work area components based on the data steward identifier, individual tab master names, and individual tab components, and further wherein an interactive user interface data steward's work area display includes a data stewardship certification level name selected via a drop down menu that includes: a certified domain basis; a certified enterprise basis; and a certified project basis.

9. The method of claim 8, wherein the metadata template further includes: (i) a steward name, (ii) a steward position title, and (iii) a project domain.

10. The method of claim 8, wherein the metadata template includes at least five of: (i) an owner, (ii) a reference number, (iii) an action requested/certification notes, (iv) a definition source or origin, (v) a derivation, (vi) an action description, (vii) a term type name, (viii) a term name, (ix) an acronym, (x) an existing term definition, (xi) a proposed term definition, (xii) the data stewardship certification level name, (xiii) a data quality business requirements indicator, (xiv) a parent category name, (xv) a referencing category name, (xvi) a related master name, (xvii) a related master name parent category name, (xviii) an example or sample, and (xix) term usage text.

11. The method of claim 8, wherein the certification of the validated entries in the metadata template includes a duplicate term name check process to check terms in the metadata template against existing terms in the enterprise metadata repository.

12. The method of claim 8, wherein the metadata template includes a scope overview and at least one content owner name, and, for that content owner name, content owner contact information, a role, applicable tab name, and applicable column headings.

\* \* \* \* \*